Figure 1:
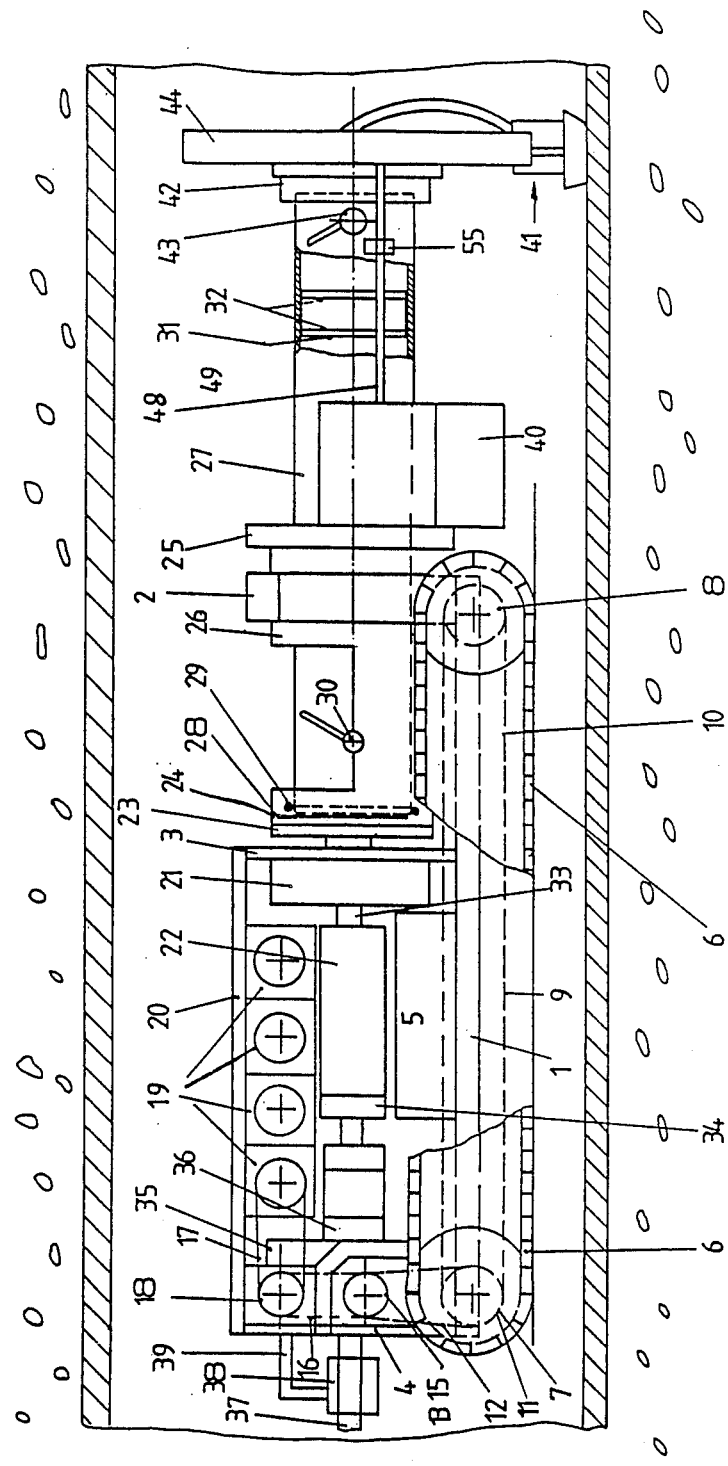

United States Patent [19]

Himmler

[11] Patent Number: 4,782,786

[45] Date of Patent: Nov. 8, 1988

[54] DEVICE TO FILL AND GLUE ALL KINDS OF DEPRESSIONS IN INACCESSIBLE PIPE CONDUITS

[75] Inventor: Erich Himmler, Zurich, Switzerland

[73] Assignee: Kunststoff-Technik AG Himmler, Zurich, Switzerland

[21] Appl. No.: 921,054

[22] PCT Filed: Feb. 13, 1985

[86] PCT No.: PCT/CH85/00026

§ 371 Date: Nov. 25, 1986

§ 102(e) Date: Nov. 25, 1986

[87] PCT Pub. No.: WO86/04975

PCT Pub. Date: Aug. 28, 1986

[51] Int. Cl.⁴ ............................................. B05C 7/08
[52] U.S. Cl. .................................. 118/713; 118/105; 118/408; 118/DIG. 10
[58] Field of Search ....... 118/105, 713, 112, DIG. 10, 118/408, 306

[56] References Cited

U.S. PATENT DOCUMENTS

| | | | |
|---|---|---|---|
| 2,910,042 | 10/1959 | Gallmeyer et al. | 118/306 X |
| 3,895,604 | 7/1975 | Ryan | 118/306 |
| 3,960,644 | 6/1976 | McFadden | 118/323 X |
| 4,308,824 | 1/1982 | Muta et al. | 118/105 X |
| 4,329,937 | 5/1982 | Holland | 118/105 |

Primary Examiner—John McIntosh
Attorney, Agent, or Firm—Ladas & Parry

[57] ABSTRACT

The device consists of a mastic material-filled pipe (27) set in a cylinder (24) which is revolvable around its longitudinal axis and secured there against displacement by means of locks (30). Inside the pipe (27) is a piston (31) which is acted upon by a conduit (33) with compressed air. On the free end of the pipe (27) is a mastic spreading device (41) which is locked to the pipe. The piston (31) forces the material out of the pipe into the mastic spreading device which is revolvable together with the pipe around the longitudinal axis thereof. Once the mastic spreading device (41) has been fully emptied, it is removed from the pipe (27) and the latter is separated from the cylinder (24). The empty pipe is replaced by a full pipe and the mastic spreading device is again attached to the latter. In this way the device is again ready for use within a short time.

10 Claims, 3 Drawing Sheets

DEVICE TO FILL AND GLUE ALL KINDS OF DEPRESSIONS IN INACCESSIBLE PIPE CONDUITS

The invention refers to a device to fill in and glue all kinds of depressions in inaccessible pipe conduits. The invention includes a remote-controlled vehicle carrying a mastic spreading device or apparatus for depositing and spreading the material used for filling and glueing. It also includes a television camera for locating depressions. These depressions are craters, breakouts or cracks. Cracks must not only be filled but the material used to fill them needs to connect the walls of the cracks in a manner that renders them capable of again supporting loads; the walls of the crack need to be glued together.

A device that repairs such inaccessible pipe conduits, i.e. those of a diameter of 25–100 centimeters (10 to 40 inches) is already known from European patent specification No. 0 025 204. It comprises, a device that drills holes into the damaged spots of the conduit for subsequently closing them, and a supplementary device which fills the drilled holes already closed from the outside at the inner side with a mastic material. The supplementary vehicle then brushes this area so that the conduit again presents a completely smooth inner surface, at least at the repair spot. This supplementary device could be used independently if the depressions are only minor corrosion spots or breakouts that do not need to be drilled and that can be repaired by simple coating with mastic material.

In the invention disclosed in European patent specification No. 0 025 204 however, the supplementary vehicle for carrying out the closure of the holes, i.e. the mastic spreading device or apparatus, is integral with the drilling device. For construction purposes the mastic carrying conduits were built rigidly into the device. This meant that after each job was completed the device had to be withdrawn from the conduit to be free from the rapidly hardening mastic material and to be cleaned at an accessible location to the conduit, i.e. below a vertical servicing manhole. This resulted in delays in using the device which prevented the repair work to be carried out rapidly.

The object of the present invention resides in introducing as a separate machine an improved supplementary device for filling the drilled, milled or at least damaged spots in the conduit (the drilling of the holes or the milling of the cracks being no longer a part of the same machine in such a manner that, after completing a job the present machine may be more quickly serviced and made ready for further use. The cleaning and other attendant work therefore can be carried out independently from the operation of the device.

The present invention is characterized by a pipe removably carried on the vehicle and containing the filling material.

Preferably the pipe is supported in a cylinder revolvable by a drive about its longitudinal axis and fixed onto it by means of locks whereas the mastic spreading apparatus is disposed on the tube and connected to it by closures.

Figure 2:
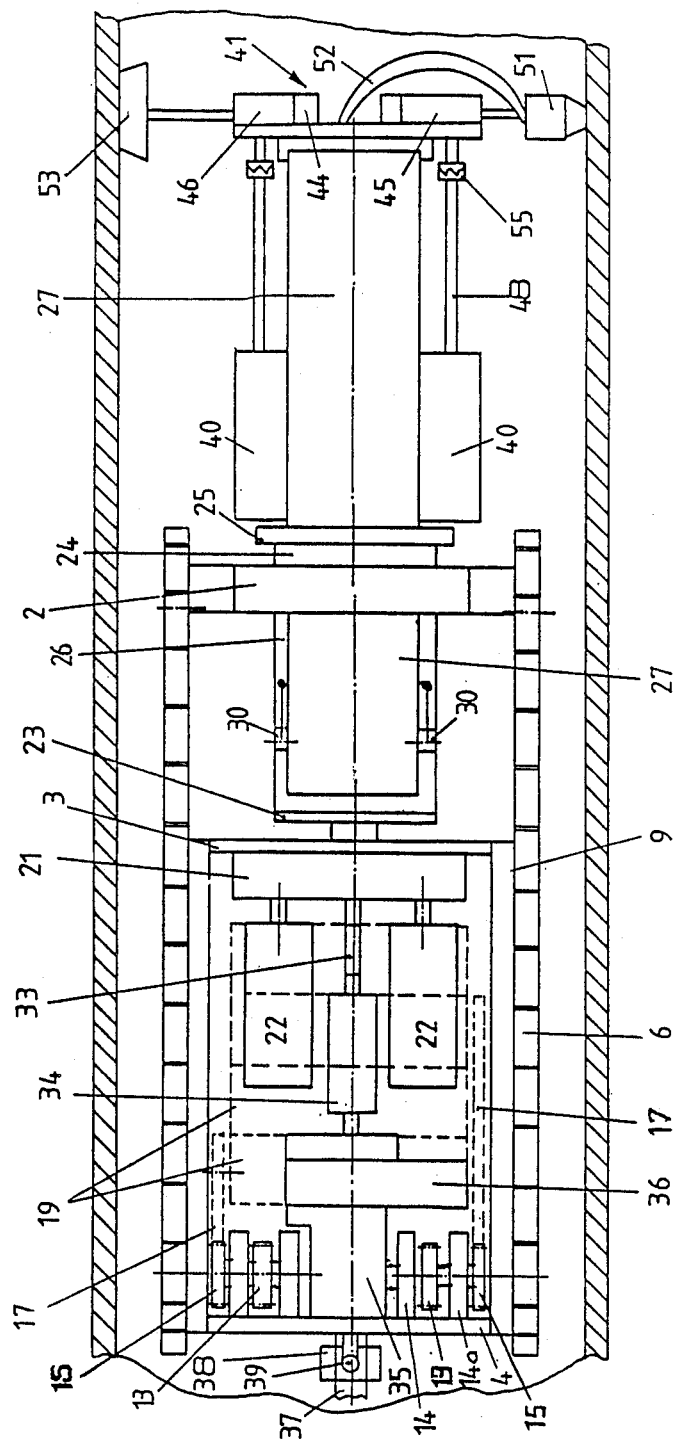
Figure 3:
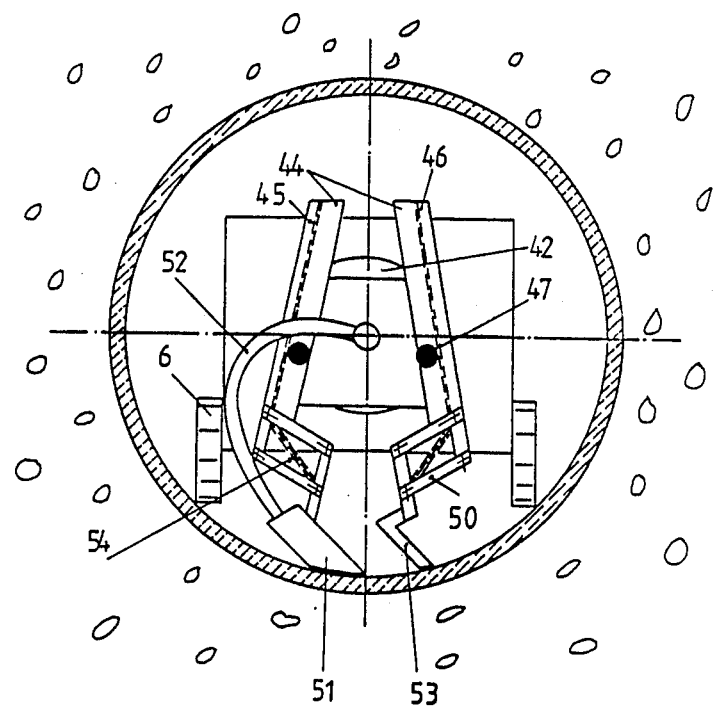

An embodiment of the device according to the present invention is illustrated in the enclosed drawings wherein FIG. 1 represents a side view of the device, FIG. 2 a view from top onto the device, the propelling drive being removed but indicated in dotted lines, and FIG. 3 a front view of the device with the mastic spreading apparatus.

The device comprises a vehicle with a base plate 1. The latter carries on its one end a large supporting bearing 2, on its center a middle vertical supporting plate 3 and its other end a second or end plate 4. The plates are secured to the base plate in a suitable manner. In addition base plate 1 carries a casing 5, close to supporting plate 3. This casing houses the electronic control for operating the entire device.

The vehicle comprises also axles supported on base plate 1 for the propelling means. These propelling means may be wheels; in the present embodiment, however, they consist of two caterpillar chains 6, one on each side of the device. Each chain runs over two wheels 7, 8, one of them, preferably both, being driven whereby wheels 8 are connected to driving wheels 7 proper by means of chains 9. Chain 6 slides between the two wheels 7,8 in an upper and lower groove of a chain guide plate 10. The width of this plate and the diameter of the two wheels 7, 8 determine the distance of base plate 1 from the bottom of the conduit; for other conduit diameters wheels 7, 8 may be replaced by those having an other diameter and correspondingly chain guiding plates 10 may be replaced by ones having a different width.

The driving of the axle of the two wheels 7 is effected via first sprockets 11, first chains 12 and second sprockets 13 which are supported between protruding ribs 14, 14a of end plate 4. On the outside of each outer rib 14a a further sprocket 15 rests on the axle of sprocket 13. Each of these outer wheels 15 receives its drive via a second and third chain 16, 17 with intermediate pairs of wheels 18. The power for propelling the vehicle is supplied by electric motors 19. Due to the limited space four motors 19 are provided of which two each are coupled together and act on one side of the vehicle. The driving motors are suspended from a cover plate 20. With the various chains and sprocket sets 11–13, 15–18 not only the selection of a suitable transmission which amongst other factors is influenced by selecting the diameter of wheels 7, 8 and the width of chain guiding plate 10 but also an easy removal of cover plate 20 resting on plates 3, 4, together with its electromotors 19, is facilitated, rendering free the apparatus below it which is yet to be described.

On supporting plate 3 a rotational bearing 21 is secured. It contains a gear driven in a manner not represented in detail by two electromotors 22 disposed in longitudinal direction of the device. On its shaft there are, on the other side of plate 3, a disk 23 and a cylinder 24 secured to the latter, the cylinder comprising over a part of its length a cutout and on its one end a flange 25. The cutout extends over half of the periphery of the cylinder so that the latter forms a kind of a semicircular shell. This cylinder 24 is supported rotatably in supporting bearing 2 and serves for receiving a pipe 27. This pipe is inserted into the cylinder from the end of its flange 25 to such an extent that it comes to rest with its end onto disk 23 against an annular seal 28 inserted into it. Preferably a further seal 29 is provided which seals the pipe 27 on its periphery and is located in cylinder 24 in the vicinity of disk 23. In the inserted position pipe 27 is arrested in its axial position by two locks 30 on the rim of the semicircular shell 26. These locks are necessary because pipe 27 which is filled with mastic has a freely movable piston 31 with two sealing rings 32, the piston serving for forcing this material out of the pipe and being acted upon by pressurized air which is introduced into cylinder 24 via a conduit 33. This conduit leads out of a rotatable bushing 34 through rotational bearing 21 and supporting plate 3 into disk 23. The purpose of rotational bushing 34 is to conduct air out of a control valve 36 which is rigidly secured to a connection block 35 attached to end plate 4 and thus is stationary, into conduit 33 rotating with disk 23 and pipe 27.

A flexible hose 37 is connected to end plate 4. It comes from a not represented compressor and contains, besides the pressurized air conduit, electric cables disposed concentrically about it for supplying current to motors 19, 22, to the electronic control in casing 5 as well as to additional consumers. The compressor itself is located on a service vehicle that is parked above the conduit to be repaired close to a vertical manhole that leads to it. The air is branched off in a coupling 38 and is conducted via a separate conduit 39 through connection block 35 into control valve 36.

Current is also required for a television camera 40 with light source. The camera is secured to flange 25 of cylinder 24. Since the latter can be rotated by means of motors 19, camera 40, too, swings about its longitudinal axis which axis must coincide exactly with the axis of the conduit to be repaired. On the television monitor in the service vehicle one can see how the conduit appears to rotate about its axis.

At the end of pipe 27 is the mastic spreading apparatus, designated globally by 41. It comprises a pipe cover 42 which is placed onto the mouth of pipe 27 and is secured thereto by means of closures 43. According to FIG. 3 pipe cover 42 carries two stationary guides 44 running obliquely towards each other, these guides supporting two racks 45, 46. The racks are in constant mesh with two pinions 47 driven via shafts 48 by two motors 49 which are disposed in longitudinal direction of pipe 27 and bolted to flange 25. Both racks support on their ends each a parallelogram link 50. The one on rack 45 itself carries a nozzle 51 which is connected via a flexible hose 52 with the inside of pipe 27. The other link, to one on rack 46, supports an elastic spatula 53. Since the entire mastic spreading apparatus 41 is secured to tube 27, it also rotates with the latter about its longitudinal axis where simultaneously motors 49 can be switched on which then extend or retract nozzle 51 and spatula 53 substantially transversely to the longitudinal axis of pipe 27. If in addition the entire vehilce is moved forwards or rearwards, it is possible to follow exactly any crack running at will in the wall of the conduit.

Whereas racks 45, 46 serve for adapting the mastic spreading apparatus to different conduit diameters, parallelogram links 50 are intended to equalize possible deviations from the circular shape of the conduuit, for which purpose they are biased by springs 54.

In operation the device is moved to the location to be repaired, with the television camera switched on. The pipe 27 filled with mastic has previously been set onto cylinder 24 and secured to it. Now pressurized air is introduced into pipe 27 and the latter is simultaneously rotated about its longitudinal axis; if the crack to be repaired runs partially in longitudinal direction, the device is moved slowly at the same time in this direction. The pressurized air forces piston 31 onwards which squeezes the material out of pipe 27; the material is spread onto the inner wall of the conduit due to the slow rotation of nozzle 51 revolving with pipe 27 and is brushed smoothly by spatula 53. When piston 31 has reached its end position, the entire device is withdrawn to the servicing manhole already referred to. There a new filled pipe 27 has already been made ready. The empty pipe is exchanged against the full one whereby only mastic spreading apparatus 41 must first be dismantled after unlocking closure 43 and opening locks 30. The full tube is placed onto the apparatus and the latter is mounted again onto the device. The exchange therefore takes place very rapidly, and the device can immediately be returned to the location where it is needed, and this practically with no loss of time. The empty pipe 27 with piston 31 is brought to the service vehicle where it is cleaned and refilled, while the device continues to operate in the conduit.

The mastic spreading apparatus can be easily dismantled from pipe 27 and is in solid connection with the rigidly mounted motors 49. Each shaft 48 consists of two parts which are meshed with each other by means of a dog clutch 55 so that the dismantling of the mastic spreading device poses no problems.

Due note must be given to the fact that the squeezing of mastic material out of nozzle 51 is neither dependent upon the rotation of pipe 27 about its longitudinal axis nor upon the movement of the vehicle. This is of importance because occasionally damaged spots must be repaired which on one hand have a limited size but on the other hand are of a considerable depth so that a lot of mastic material must be deposited on one and the same location. In such a case, particularly an overhanging damaged spot which must be repaired from below, a not represented cover plate having a central bore is placed over the spot. A hose mounted on the mouth of nozzle 51 is conducted through this bore. The substantially rectangular cover has a curvature adapted to the conduit to be repaired. Covers of the same curvature but of different lengths may be used, depending upon the size of the damaged spot. In general the cover resembles the sealing shields 9 described in European patent specification No. 0 025 204 initially referred to and serves, like the latter ones, to prevent the mastic from flowing beyond the spot where it is deposited.

There remains also the possibility of using steam instead of pressurized air which steam would exit from nozzle 51 instead of the mastic material. It is therefore also possible to use the invention for cleaning work. In order to do so the flexible hose of a high pressure steam generator located in or beside the service vehicle is conducted over the left part of the device shown in FIG. 1, and the steam nozzle at the end of the hose is mounted with its coupling in mastic spreading apparatus 41 such that the steam enters hose 52 directly.

I claim:
1. A vehicle for filling and gluing all kinds of depressions in inaccessible pipe conduits said vehicle comprising:
   a spreading means associated with said vehicle, said spreading means acting to deposit and spread a material used to fill and glue said depressions;
   locking means;
   a container for holding said material used to fill and glue said depressions, said container being removably connected to said vehicle by said locking means and communicating with said spreading means; and a piston held within said container and freely movable therein, said piston acting to push said material out of said container into said spreading means wherein upon release of said locking means said container may be easily removed from said vehicle.

2. The vehicle of claim 1 wherein said vehicle is remote controlled.

3. The vehicle according to claim 2 further comprising a cylinder for supporting said container, said container being a pipe; and
   a drive associated with said cylinder to rotate said cylinder about its longitudinal axis, said drive being secured to said cylinder by said locking means.

4. The vehicle according to claim 3 wherein said spreading means comprises;
   a hose connected to said pipe for receiving the material expelled from said pipe by said piston;
   a nozzle associated with said hose for receiving and distributing said material;
   a spatula for spreading said material;
   links; and
   racks connected to said links for supporting said spatula and said nozzle by said links such that said spatula and said nozzle may move substantially transversely to said pipe.

5. The vehicle of claim 4 wherein said piston is movable under the action of pressurized air.

6. The vehicle according to claim 5 further comprising a conduit for carrying said pressurized air to act on said piston;
   a disk associated with said conduit and connected to said cylinder; and
   a seal associated with said disk.

7. The vehicle according to claim 6 wherein said conduit passes through said disk and is rotatable therewith, said conduit and said disk being rotatable with said cylinder, said vehicle further comprising a stationary, non-rotating valve; and
   a rotational bushing connecting said valve to said cylinder.

8. The vehicle according to claim 5 further comprising pinions associated with said racks and movable thereby;
   motors mounted solidly on said cylinder and driving said pinions;
   dog clutches; and
   shafts which transmit the torque from said motors to said pinions and consist of two parts between which said dog clutches are arranged, said dog clutches enabling the removal of said spreading means from said pipe.

9. The vehicle of claim 1 further comprising a TV camera associated with said vehicle, said TV camera being used for locating said depressions.

10. The vehicle of claim 1 wherein said spreading means is removably supported on said container.

* * * * *